United States Patent [19]
Frantz

[11] Patent Number: 5,853,278
[45] Date of Patent: Dec. 29, 1998

[54] CARGO CARRIER

[76] Inventor: Charles G. Frantz, 1710 N. Airport Rd., Weatherford, Okla. 73096

[21] Appl. No.: 978,434

[22] Filed: Nov. 25, 1997

[51] Int. Cl.[6] .................................................. B60R 9/06
[52] U.S. Cl. ........................... 414/462; 224/505; 224/504
[58] Field of Search .......................... 414/462; 224/495, 224/497, 499, 502, 503, 504, 506

[56] References Cited

U.S. PATENT DOCUMENTS

| | | | |
|---|---|---|---|
| 3,202,332 | 8/1965 | Walker | 224/42.03 |
| 3,366,256 | 1/1968 | Meredith et al. | 414/462 |
| 3,760,965 | 9/1973 | Chandler | 414/462 |
| 3,891,132 | 6/1975 | Chandler | 414/462 |
| 4,099,760 | 7/1978 | Mascotte et al. | 293/73 |
| 4,213,729 | 7/1980 | Cowles et al. | 414/462 |
| 4,275,981 | 6/1981 | Bruhn | 414/462 |
| 4,695,218 | 9/1987 | Boyer | 414/462 |
| 4,705,448 | 11/1987 | Mungons | 414/462 |
| 4,775,282 | 10/1988 | Van Vliet | 414/462 |
| 4,934,894 | 6/1990 | White | 414/462 |
| 5,011,361 | 4/1991 | Peterson | 414/462 |
| 5,018,651 | 5/1991 | Hull et al. | 224/42.44 |
| 5,106,002 | 4/1992 | Smith et al. | 224/42.03 |
| 5,114,120 | 5/1992 | Bartelt et al. | 254/323 |
| 5,199,842 | 4/1993 | Watt et al. | 414/537 |
| 5,310,100 | 5/1994 | Liscinsky | 224/42.01 |
| 5,368,209 | 11/1994 | Hill | 224/42.44 |
| 5,395,020 | 3/1995 | King | 224/42.43 |
| 5,427,289 | 6/1995 | Ostor | 224/42.43 |
| 5,431,522 | 7/1995 | Ross | 414/462 |
| 5,439,151 | 8/1995 | Clayton | 224/509 |
| 5,467,910 | 11/1995 | Ritter et al. | 224/499 |
| 5,482,424 | 1/1996 | Jones et al. | 414/462 |
| 5,664,717 | 9/1997 | Joder | 224/502 |
| 5,680,976 | 10/1997 | Koliopoulos et al. | 414/462 |

*Primary Examiner*—Karen M. Young
*Assistant Examiner*—Gregory A. Morse
*Attorney, Agent, or Firm*—Molly D. McKay

[57] ABSTRACT

A cargo carrier having a torque bar assembly that attaches to a female trailer hitch adapter provided on a rear end of a vehicle. The cargo carrier is provided with a platform that attaches on one of its ends to one end of the torque bar assembly by means of a unique double slanted axis. The other end of the platform releasably latches to an opposite end of the torque bar assembly. The double slanted axis causes a rear end of the platform to be elevated above horizontal when the platform is unloaded and latched to the torque bar assembly and causes the platform to swing slightly uphill when it is unloaded and unlatched on one end from the torque bar assembly and is swung away from the vehicle by means of a speed controlling safety device provided attached to the platform and to the torque bar assembly. An alternate embodiment cargo carrier is electrically operated and provides for reversibly lowering one end of the platform to the ground for loading a wheelchair thereon.

19 Claims, 4 Drawing Sheets

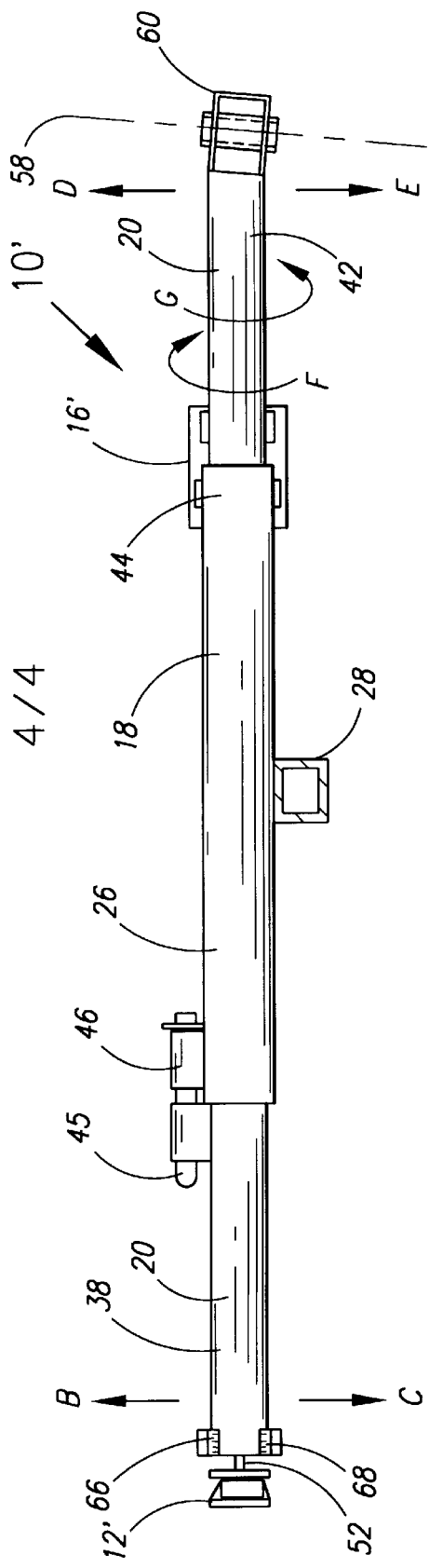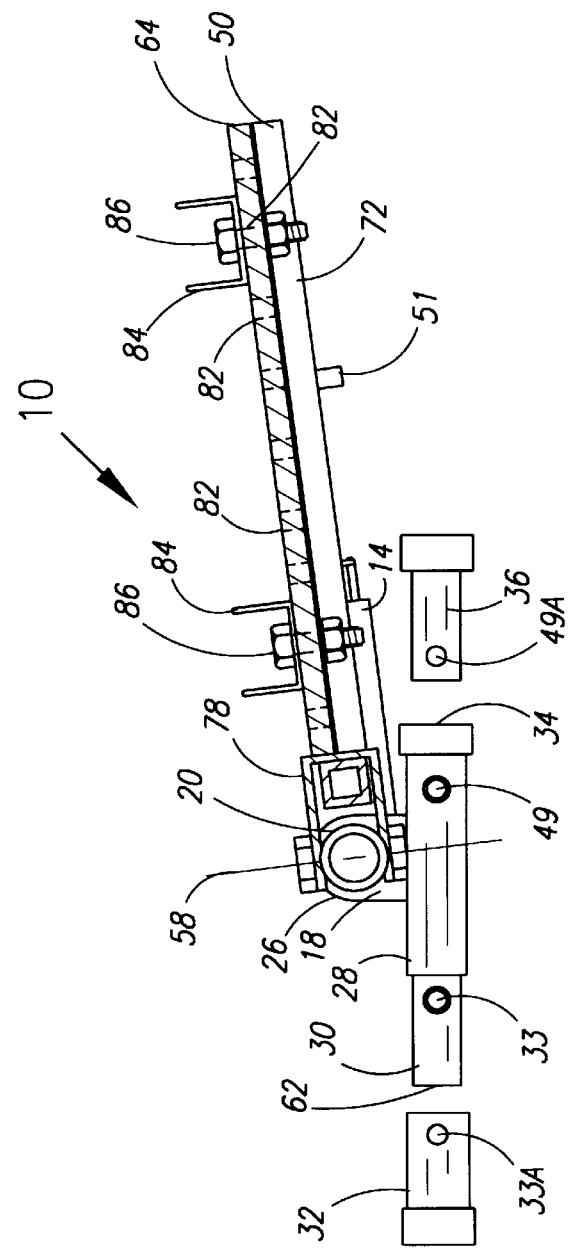
Fig. 4
Fig. 5

CARGO CARRIER

BACKGROUND OF THE INVENTION

1. Field of the Invention

The present invention relates to a cargo carrier attachable to a female adapter of a removably trailer hitch provided at the rear end of a vehicle. A platform of the cargo carrier pivots upward approximately parallel with the rear end of the vehicle for storage and pivots downward slightly off perpendicular in relationship to the rear end of the vehicle for use. The platform reversibly releases on a first end from the cargo carrier to swing outward from the rear-end of the vehicle and slightly upward from horizontal. An alternate embodiment of the invention is provided with an electrical latch at the first end of the platform, a first electrical actuator on an opposite second end of the platform for forcing the platform to swing outward from and inward toward the rear end of the vehicle, and a second electrical actuator for lowering a first end of said opened platform to the ground and raising it therefrom.

2. Description of the Related Art

It is often desirable to transport a bulky or odd sized object, such as for example, a dishwasher, a wheel chair or a motorcycle, which cannot because of its size be fitted into the family car, van or four wheel drive vehicle. In these situations, the vehicle owner is faced with the options of hiring someone to transport the object, renting a vehicle capable of transporting the object or adding some type of cargo carrier onto their existing vehicle to allow them to transport the object with their vehicle.

The present invention solves this problem by providing a cargo carrier removably securable to a female adapter of a removable trailer hitch that is commonly provided at the rear end of the vehicle. The present invention is provided with a platform on which objects can rest during transport. One end of the platform reversibly releases from the cargo carrier and swings outward from the rear end of the vehicle via a double slanted axis that pivotally secures an opposite end of the platform to the cargo carrier. Because the axis is doubly slanted, i.e. the axis is tilted backward and also sideward, the platform's rear end is raised above horizontal when the platform is latched to the cargo carrier and a free end of the platform rises upward relative to the ground as the platform swings outward from the vehicle when the platform is unlatch from the cargo carrier on one end.

This unique double slanted axis allows the platform to remain approximately level when the platform is latched and fully loaded and to swing approximately level when the loaded platform is unlatched. The upward swing created by the doubly slanted axis is counteracted by the torque exerted on the cargo carrier due to the weight of the object. Thus, the heavily loaded platform will swing outward from the rear end of the vehicle in a fairly level, horizontal path. If the axis had not been altered to force the loaded platform to swing upward, the torque exerted on the platform by a heavy object would have caused the free end of the platform to swing downward toward the ground and the object could easily have tipped over or fallen off the platform as the platform swing downward.

When not in use the platform can be pivoted upward and releasably secured so that it is approximately parallel with the rear end of the vehicle. The cargo carrier is provided with a female adapter that allows the user to attach a trailer or trailer hitch to the vehicle via the cargo carrier while the cargo carrier remains attached to the vehicle and secured in this approximately vertical position.

Also, the entire cargo carrier can be removed from the vehicle by disengaging a male coupling provided centrally on the cargo carrier from the female adapter that is provided on the vehicle.

An alternate embodiment of the invention, designed specifically for transporting objects such as wheelchairs, is fully automated. The alternate embodiment is provided with an electrically operated latch for reversible releasing a first end of the platform from the cargo carrier. Once the first end of the platform is released, a first electrically operated actuator causes the platform to swing outward from the vehicle, pivoting on the double slanted axis that secures the opposite second end of the platform to the cargo carrier. When the platform is fully swung outward from the vehicle, a second electrically operated actuator causes a torque rod provided on the cargo carrier to rotate. The platform is secured to the torque rod via the double slanted axis and rotation of the torque rod causes the first end of the platform to be lowered to the ground. In this position the object to be transported can be moved onto the platform. Then the second actuator is activated to rotate the torque rod in the opposite direction to again raise the first end of the platform. The first actuator is next activated to swing the platform back toward the vehicle and the electrically operated latch resecures the first end of the platform to the cargo carrier.

SUMMARY OF THE INVENTION

The present invention is a cargo carrier that is provided with a carrier adapter for removably securing the cargo carrier to a vehicle. A first male end on the carrier adapter removably secures into a female adapter provided on a rear end of the vehicle in order to removably secure the cargo carrier to the vehicle. Openings are provided in both the female adapter and the first male end to permit a fastener to be inserted therethrough to secure them together. An opposite second female end of the carrier adapter extends rearward from the vehicle and is capable of removably receiving a male adapter of a trailer hitch, boat trailer, or other similar device. Openings are provided in both the second female end and the male adapter to permit a fastener to be inserted therethrough to secure them together.

A hollow tube secures to the carrier adapter so that the hollow tube is perpendicular to the carrier adapter, the hollow tube is approximately parallel with the ground and the hollow tube and the carrier adapter together form a T-bar. A torque bar extends through the hollow tube so that the torque bar freely rotates within the hollow tube and first and second ends of the torque bar extend outward beyond the first and second ends respectively of the hollow tube.

A spring loaded pin is movably secured to the first end of the torque bar adjacent the first end of the hollow tube. The first end of the hollow tube is provided with two sleeves, each located adjacent the first end of the torque bar so that the spring loaded pin can enter into one of the sleeve with which it aligns in order to prevent the torque bar from rotating within the hollow tube.

A platform releasably secures on its first end to the first end of the torque bar so that the platform extends rearward of the torque bar. The torque bar is provided with an outwardly extending ear which can be releasably engaged by a manually operated latch provided on the first end of the platform. The first end of the torque bar is also provided with a pair of spaced apart fingers that extend rearward and that widen in separation from each other rearward. One upper finger is located above the other lower finger and together the fingers receive between them the first end of the platform as its latch approaches the ear, thus creating a self aligning latching mechanism. A side handle is provided on the first end of the platform for the user to grasp in order to slightly lift that end of the platform to insure that the platform enters between the fingers, such as when the platform is heavily loaded with objects.

The platform pivotably secures on its second end to the second end of the torque bar by means of a double slanted axis. The axis is double slanted because it slants upward and to the right side of the cargo carrier and also slants upward and toward the front end of the cargo carrier. This double slanted axis causes two things: it causes a rear end of the platform to be slightly elevated when the platform is in its latched, in use position, by virtue of the pin being engaged with the appropriate sleeve, and it also causes the first end of the platform to rise slightly as the platform swings away from the vehicle after being unlatched from the first end of the torque bar.

The platform is provided with a perimeter frame. A wire mesh extends between the various sides of the frame, forming a floor of the platform for receiving objects to be transported on the cargo carrier. Support bars are also provided extending between opposite sides of the frame to provide additional support and strength to the platform. Handles are provided on the underneath or bottom side of the platform. In order for the user to lift the platform into a stored position so that the platform is approximately parallel with the rear end of the vehicle, the following steps are performed. The platform is first latched to the torque bar and the pin is removed from the first sleeve in order to allow the torque bar to freely rotate within the hollow tube. The user then lifts the platform upward by grasping the handles provided on the bottom side of the platform until the pin aligns with the second sleeve. The pin is then allowed to enter the second sleeve which holds the platform in its vertical, out of service position. These steps are reversed to again lower the platform to its in use position.

Both the front end and the rear end of the platform are provided with stake holders designed to receive stakes provided on a variety of removable accessories, such as for example a bicycle rack or holder. In addition vertical openings are provided in both the first and second ends of the platform to receive fasteners, such as bolts, that can be used in order to secure to the platform additional removable accessories, such as for example wheelchair wheel guides.

The torque bar is designed to flex upward and downward in a vertical plane and to undergo torsional flexing to provide a smoother ride for the objects being transported on the platform. The cargo carrier is provided with a gas charged spring cylinder that attaches on one of its ends to the second end of the torque bar and on its opposite end to the second end of the platform. The gas charged spring cylinder is outwardly biased, thus assisting the platform to swing outward from the vehicle and slightly upward from horizontal whenever the latch is released.

An alternate embodiment cargo carrier that is a fully automated, electrical device is identical to the cargo carrier described above except that instead of employing a manually operated latch, an electrically operated latch is employed; instead of employing a gas charge spring cylinder to open the platform, a first electrically powered actuator is employed to open and to close the platform; and instead of using the pin and sleeves to control rotation of the torque bar within the hollow tube, a second electrically powered actuator is added at the junction of the second ends of the hollow tube and torque bar in order to lower the first end of the fully opened platform to the ground and to raise the platform back up from the ground. In this alternate embodiment, the pin is only allowed to engage one sleeve, the first sleeve which aligns with the pin when the platform is in its in-use position, and only then when the object is being transported, serving as a safety locking mechanism. At all other times, the pin is disengaged from the sleeve in order that the second electrically powered actuator may function properly.

Each of the electrical components previously described for the alternate cargo carrier receives power from the vehicle and each is provided with appropriate electrical switches to control its operation.

BRIEF DESCRIPTION OF THE DRAWINGS

FIG. 4 is a cross sectional view taken along line 4—4 of FIG. 2.

FIG. 5 is a cross sectional view taken along line 5—5 of FIG. 1, showing a second slant of the axis and illustrating use of optional removal wheel guides attached to the platform.

DETAILED DESCRIPTION OF THE PREFERRED EMBODIMENT INVENTION

Figure 1:
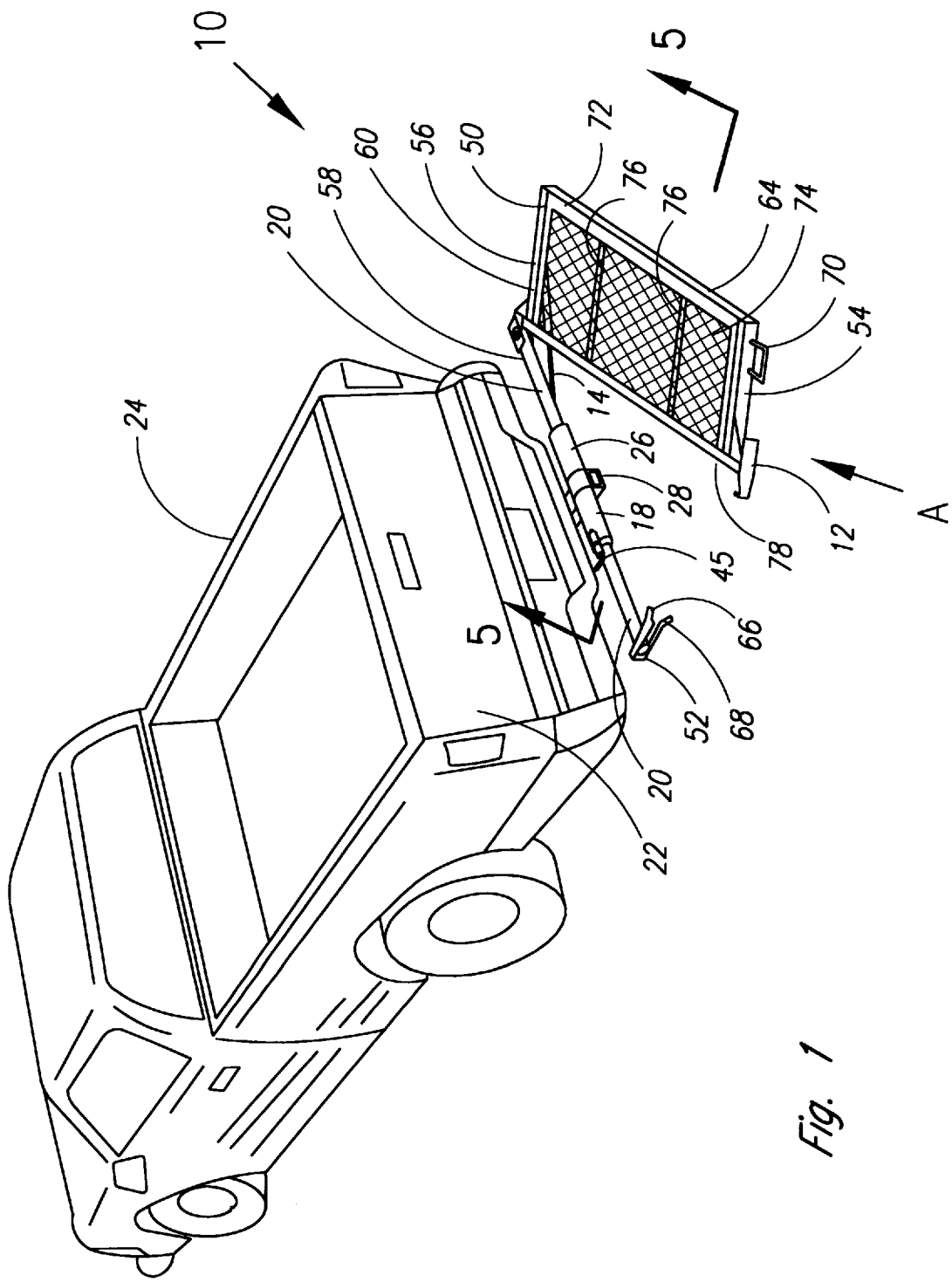
FIG. 1 is a perspective view of a vehicle to which is attached a cargo carrier constructed in accordance with a preferred embodiment of the present invention.
Figure 2:
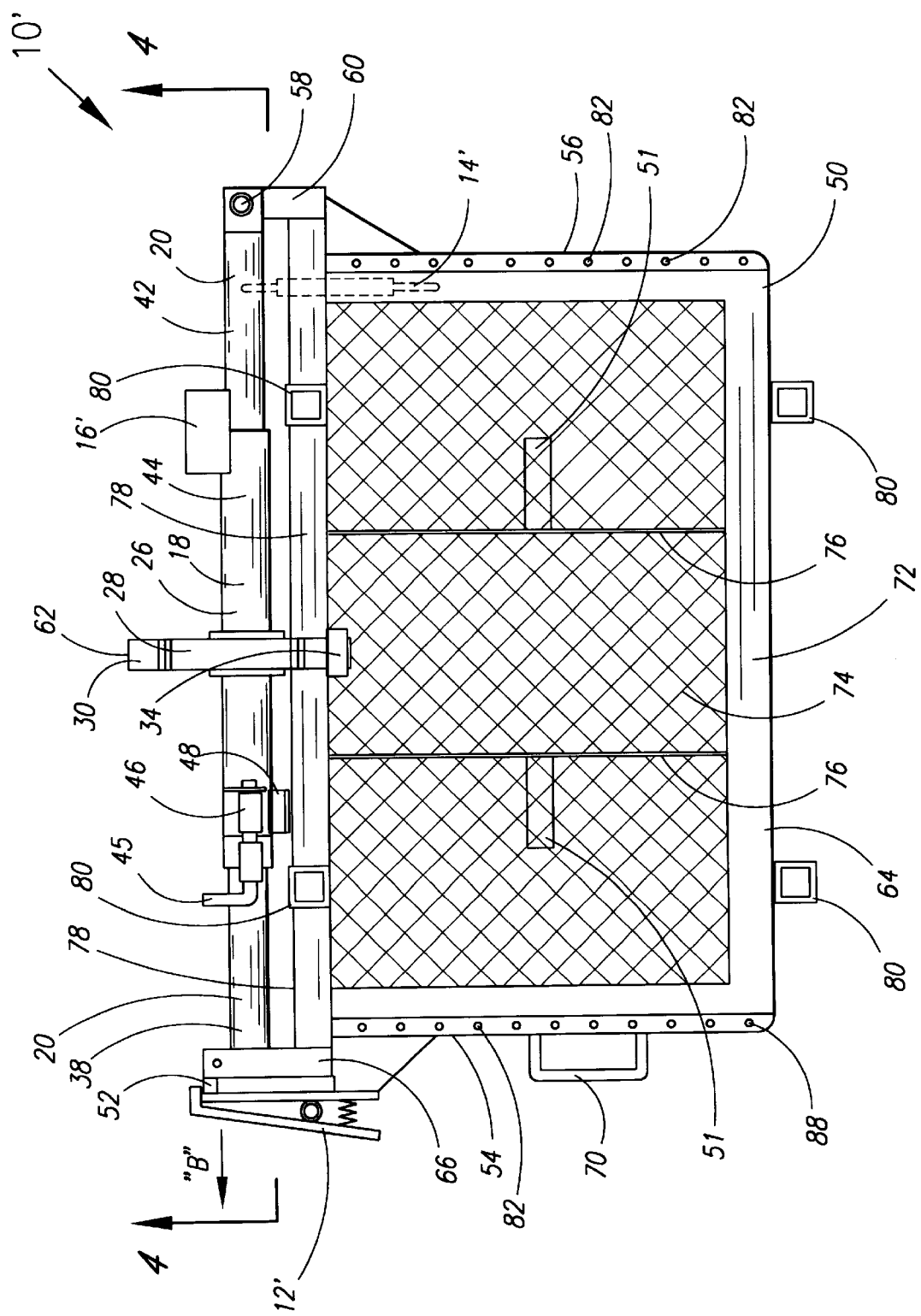
FIG. 2 is a top plan view of an alternate cargo carrier, with the cargo carrier in a closed position.
Figure 3:
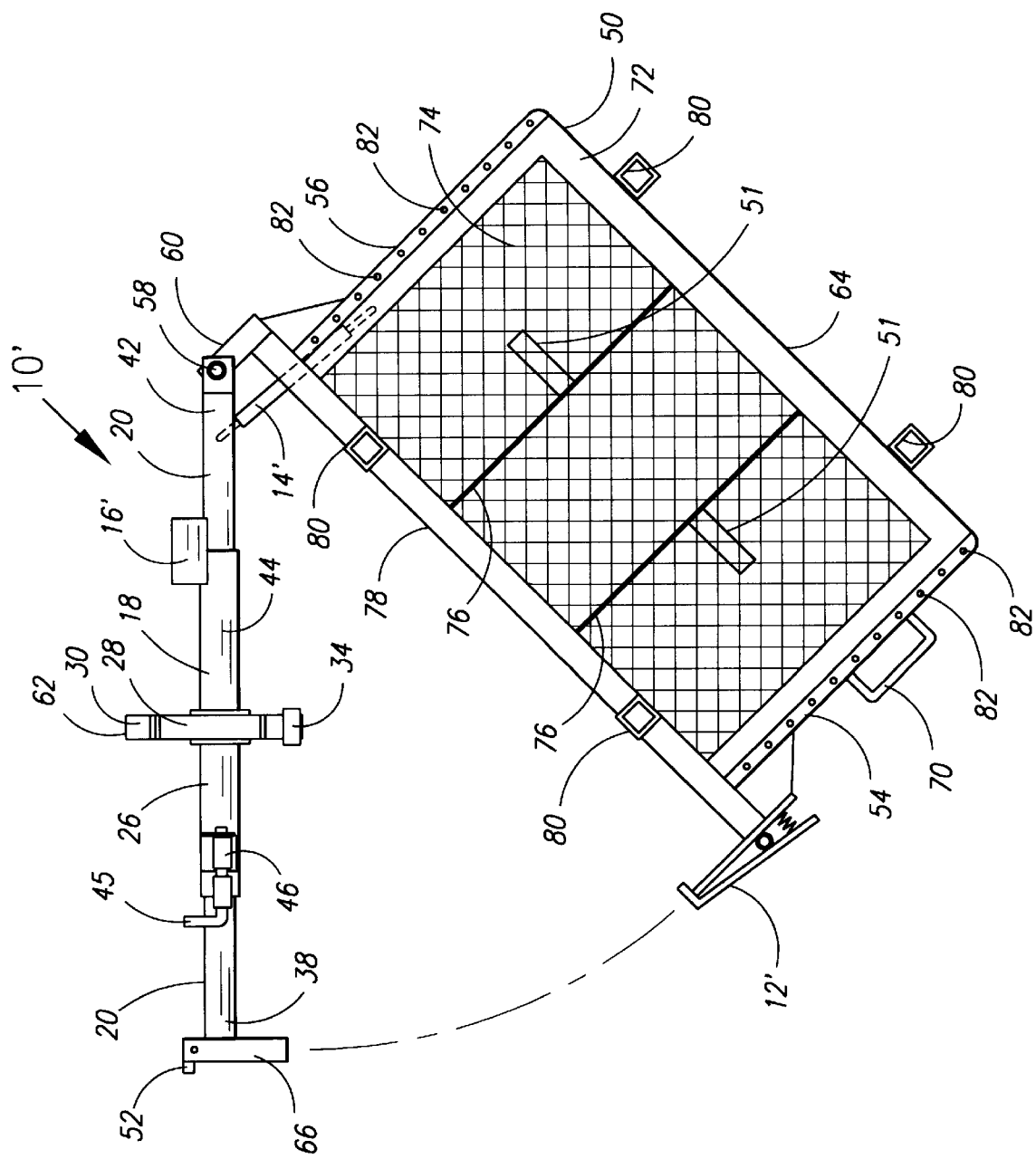
FIG. 3 is a top plan view of the alternate cargo carrier shown in a partially open position.

Referring now to the drawings and initially to FIG. 1, there is illustrated a cargo carrier 10 constructed in accordance with a preferred embodiment of the present invention. FIGS. 1 and 5 illustrate the cargo carrier 10, and FIGS. 2, 3, and 4 illustrate an alternate embodiment cargo carrier 10'. The alternate cargo carrier 10' is identical to the cargo carrier 10 except for the substitution of an electrically operated latch 12' instead of a manually operated latch 12, the substitution of a first electrically powered actuator 14' instead of a gas charged spring cylinder 14, and the addition of a second electrically powered actuator 16' at the junction of the T-bar 18 and the torque tube or bar 20. In all other respects, the cargo carrier 10 and the alternate cargo carrier 10' are identical. For this reason, all figures will be employed to illustrate and describe the cargo carrier 10. FIGS. 2, 3 and 4 will be employed to additionally illustrate those features unique to the alternate embodiment cargo carrier 10'.

Referring now to FIGS. 1 and 5, the cargo carrier 10 removably secures by means of the T-bar 18 provided on the cargo carrier 10 to a rear end 22 of a vehicle 24. The T-bar 18 is provided with a hollow tube 26 secured perpendicularly to a carrier adapter 28. A first end 30 of the carrier adapter 28 is a male end that removably inserts into a female adapter 32 normally provided secured to the rear end 22 of the vehicle 24. The first end 30 is provided with an opening 33 therethrough and the female adapter 32 is provided with a mating opening 33A therethrough. A fastener (not illustrated) may be inserted into openings 33 and 33A to secure the first end 30 to the female adapter 32.

An opposite second end 34 of the carrier adapter 28 is a female end that is similar to the female adapter 32 provided on the vehicle 24. The second end 34 is capable of removably receiving a male adapter 36, such as those found on removable hitches, boat trailers, etc.

The torque bar 20 extends through the hollow tube 26 of the T-bar 18 so that a first end 38 of the torque bar 20 extends outward beyond one end 40 of the hollow tube 26 and an opposite second end 42 of the torque bar 20 extends outward beyond a second end 44 of the hollow tube 26.

The torque bar 20 freely rotates within the hollow tube 24. The torque bar 20 can be secured to the hollow tube 24 by means of a spring-loaded pin 45 so that it does not rotate therein. The spring-loaded pin 45 is provided movably secured on the first end 38 of the torque bar 20 adjacent the first end 40 of the hollow tube 26. The pin 45 removably inserts into one of two sleeves, 46 or 48, provided on the first end 40 of the hollow tube 26. As illustrated in FIG. 2, when the cargo carrier 10 is in use, the pin 45 is inserted into sleeve 46. When the cargo carrier 10 is not in use, the pin 45 can be removed from sleeve 46 to allow the torque bar 20 to rotate within the hollow tube 26. A platform 50 that is pivotably secured to the second end 42 of the torque tube 20 can then be raised into a position so that the platform 50 is approximately parallel with the rear end 22 of the vehicle 24. It can then be secured in this position by inserting the pin 45 into sleeve 48 which will then be in alignment with the pin 45.

When the platform 50 is in position approximately parallel with the rear end 22 of the vehicle 24, it is out of the way and a male adapter 36 on a boat, trailer hitch, or similar device can be secured to the second female end 34 of the carrier adapter 28 without the need to remove the cargo carrier 10 from the vehicle 24. As shown in FIG. 5, the second female end 34 is provided with an opening 49 which aligns with an opening 49A in the male adapter 36 when the male adapter 36 is fully inserted into the second female end 34. A fastener (not illustrated) may be inserted through openings 49 and 49A to secure the male adapter 36 to the second female end 34.

Handles 51 are provided on a bottom side of the platform 50 as an aid in raising the platform 50 into position approximately parallel with the rear end 22 of the vehicle 24 and as an aid in lowering the platform 50 back to its in use position. The handles 51 are also useful in grasping the cargo carrier 10 when securing or removing the cargo carrier 10 to or from the vehicle 24 when the platform 50 is locked in its raised out-of-use position. Also, once the cargo carrier 10 is removed from the vehicle 24, the handles 51 serve as a convenient means for grasping the cargo carrier 10 in order to move it.

On the alternate embodiment cargo carrier 10', the spring loaded pin 45 is employed only to engage sleeve 46 during transport of an object and remains disengaged at all other times. The pin 45 does not engage sleeve 46 in the alternate embodiment cargo carrier 10' since this embodiment is not capable of having its platform 50 pivoted upward parallel with the rear end 22 of the vehicle 24.

The alternate embodiment cargo carrier 10' is additionally provided with the second electrically powered actuator 16' located preferably at the junction of the hollow tube 26 and the torque tube 20. Although the second electrically powered actuator 16' is described and shown as being located at the junction of the second end 44 of the hollow tube 26 and the second end 42 of the torque bar 20, it is not so limited, and although not illustrated, may alternately be located at the junction of the first end 38 of the torque bar 20, depending on the weight of the objects to the transported and thus the degree of torque or flex needed in the torque bar 20. The second actuator 16' movably engages the hollow tube 26 and the torque tube 20, thus rotating the torque tube 20 within the hollow tube 26 in order to force the platform 50 to pivot downward to the ground, and alternately, to raise the platform 50 to its original position above the ground.

On the cargo carrier 10, the first end 38 of the torque tube 20 is provided with an outwardly extending ear 52 which is removably engaged by the manually operated latch 12 that is provided secured to a first end 54 of the platform 50, and is secured to the platform 50 at a corner of the platform 50 located adjacent to the first end 38 of the torque tube 20 when the platform 50 is latched thereto.

The manually operated latch 12 is normally spring biased in a latched position and can be unlatched by exerting pressure on the latch 12, as shown by Arrow "A" in FIG. 1.

The alternate embodiment cargo carrier employs the electrically operated latch 12', shown in FIG. 2. Similar to the operation of the manually operated latch 12, the electrically operated latch 12' is normally in a latched position and can be electrically activated to apply a pulling force on the latch 12' in the direction of Arrow "B" to unlatch the electrically operated latch 12'.

Once the latch 12, or alternately the electrical latch 12', is unlatched, a first end 54 of the platform 50 is free to swing away from the vehicle 24. The platform 50 is pivotably secured by its opposite second end 56 to the second end 42 of the torque tube 20 by means of a double slanted axis 58.

As shown in FIG. 4, the axis 58 slants upward and outward toward the right side 60 of the cargo carrier 10, or alternately, the alternate cargo carrier 10'. Also, as shown in FIG. 5, the axis 58 also slants upward and forward toward the front end 62 of the cargo carrier 10, or alternately, the alternate cargo carrier 10'.

Thus, the axis 58 is doubly or dually slanted. This double slant axis 58 causes the platform 50 to be sloped slightly upward at a rear end 64 of the platform 50 when the platform 50 is latched on its first end 54 to the first end 38 of the torque bar 20 and causes the platform 50 to swing "uphill" when the first end 54 of the platform 50 is unlatched from the first end 38 of the torque tube 20.

It is important that the unloaded platform 50 be sloped upward slightly at its rear end 64 when the platform 50 is latched closed because when loaded with a heavy object, the platform 50 will tend to tip downward at its rear end 64. The upward slant of the platform 50 provided by one of the slants or slopes of the double slanted axis 58 thus counteracts the tendency of the rear end 64 of the platform 50 to tip downward when loaded and instead allows the platform 50 to remain approximately level when it is loaded and in its latched position. By the platform 50 staying approximately level when loaded, there is less danger of objects sliding off or being bounced off the platform 50 during transport. It is the forward and upward slope of the axis 58, illustrated in FIG. 5, that makes this possible.

It is also important that the platform 50 swing uphill when the first end 54 of the platform 50 is unlatched from the first end 38 of the torque tube 20. This is made possible by the upward and outward slope of the axis 58, illustrated in FIG. 4. This uphill swing of the unlatched platform 50 assists in keeping the loaded platform 50 approximately level as it swings away from the vehicle 24, as shown in FIG. 1. This uphill swing of the unlatched platform 50 also aids in relatching the first end 54 of the platform 50 to the first end 38 of the torque bar 20.

As illustrated in FIG. 1, the first end 38 of the torque bar 20 is provided with a pair of rearwardly extending fingers, an upper finger 66 and a lower finger 68 located beneath the upper finger 66. The fingers 66 and 68 are spaced apart from each other and the distance between the fingers 66 and 68 decreases adjacent to the ear 52. The fingers 66 and 68 serve as guides to align the latch 12 or, alternatively, the electrically operated latch 12' with the ear 52 so that the first end 54 of the platform 50 can be repeatedly latched and unlatched from the first end 38 of the torque tube 20. If the platform 50 did not swing uphill when unlatched, when the platform 50 was loaded and being swung back toward the vehicle 24, the first end 54 of the platform might, due to the downward pressure on it exerted by the weight of the object loaded thereon, pass underneath the lower finger 68 instead of between the fingers 66 and 68. This misalignment would thus making it difficult to relatch the platform 50 to the torque tube 20 and defeating the self aligning purpose of the fingers 66 and 68 in association with the ear 52 and latch, 12 or 12'.

In the event that the platform 50 is loaded to such a degree that the platform does not pass between the fingers 66 and 68 as it swings closed, a side handle 70 provided on the first end 54 of the platform 50 may be grasped by the user to lift slightly upward on the first end 54 of the platform 50 as it swings shut so that the platform 50 passes between the fingers 66 and 68 and its latch, 12 or 12', is guided thereby into latching engagement with the ear 52. The side handle 70 may also be grasped in order to assist in opening or closing the platform 50 and also in raising and lowering the platform 50 between its out of use position and its in use position.

The platform 50 is preferably constructed with a perimeter frame 72 to which heavy metal mesh 74 secures to form a floor of the platform 50. The platform 50 is provided with several support bars 76, each of which secures on one of its ends to the frame 72 at the front end 78 of the platform 50 and secures on its opposite end to the frame 72 at the rear end 64 of the platform 50. The support bars 76 provide additional support for the mesh 74 making it sufficiently strong to receive the weight of heavy objects that may be placed thereon.

The frame 72 is provided with stake holders 80 at the front end 78 and the rear end 64 of the platform 50. The stake holder 80 are sized to receive standard sized stakes (not shown) in order to removably secure a variety of accessories to the cargo carrier 10 or the alternate cargo carrier 10'. For example, a removable bicycle rack (not shown) can be secured to the platform 50 via the stake holders 80 by inserting stakes provided on the bicycle rack into the stake holders 80.

The frame 72 is also provided with a plurality of openings 82 extending vertically therethrough on both the first end 54 and the second end 56 of the platform 50. These openings 82 provide attachment sites for additional accessories, such as for example "U" shaped wheelchair wheel guides 84 which secure by means of bolts 86 to the platform 50 via these openings 82, as illustrated in FIG. 5.

The cargo carrier 10 is provided with the gas charged spring cylinder 14 that attaches by one end to the second end 42 of the torque tube 20 and attaches by its other end to the frame 72 at the second end 56 of the platform 50. The cylinder 14 is spring biased outward so that it can assist in pushing the platform 50 slightly uphill as the platform 50 swings away from the vehicle 24 after the platform 50 has been unlatched. The gas charges spring cylinder 14 also serves as a safety device by causing the platform 50 to swing outward at a controlled, safe speed rather than allowing the platform 50 to swing in an uncontrolled manner or at a speed that might be unsafe to the user.

In the alternate embodiment cargo carrier 10', the gas charged spring cylinder 14 is replaced by the first electrically powered actuator 14'. Similar to the function of the cylinder 14, the first electrically powered actuator 14' attached by one end to the second end 42 of the torque tube 20 and attached by its other end to the frame 72 at the second end 56 of the platform 50. Also, like the cylinder 14, it causes the platform 50 to swing in a controlled manner and at a controlled speed away from the vehicle 24 after the platform 50 has been unlatched. However, the first electrically powered actuator 14' also is capable of causing the platform 50 to swing back toward the vehicle 24 in order to relatch the platform 50 to the torque bar 20.

Although not illustrated, it is obvious that the electrically operated latch 12', the first electrically powered actuator 14' and the second electrically powered actuator 16' each receives power from an electrical connection to the vehicle 24 and each is provided with its own proper activating switch to cause it to be electrically activated so it will function as described. Such electrical connections and switches are widely known and will not be described in detail here since the arrangement and configuration of these may vary.

The function of the torque bar 20 is also important and will be described. The torque bar 20 is secured against rotation relative to the hollow tube 26 by means of the pin 45 for the cargo carrier 10, or by means of the second electrically powered actuator 16' for the alternate embodiment cargo carrier 10'. Although the torque bar 20 is thus secured against rotation, by virtue of its design, both ends 38 and 42 of the torque bar 20 are able to flex upward and downward in a vertical plane, as illustrated in FIG. 4 by Arrows "B", "C", "D" and "E". By flexing in a vertical plane, the torque bar 20 tends to cushion the platform 50 from bumps and thus serves a function similar to a shock absorber for the cargo carrier 10 or for the alternate embodiment cargo carrier 10'.

Additionally the ends 38 and 42 of the torque bar 20 flex torsionally and in particular, the second end 42 of the torque bar 42 is able to flex torsionally as illustrated in FIG. 4 by Arrows "F" and "G". This ability of the torque bar 20 to flex torsionally allows the platform 50 to be pushed downward slightly by the weight of the objects loaded thereon without causing structural damage to the cargo carrier 10 or to the alternate embodiment cargo carrier 10'. Also the torsional flexing of both ends 38 and 42 of the torque bar 20 allows the objects resting on the platform 50 to receive a "softer" ride during transport since the torsional flexing also tends to cushion the ride similar to the function of a shock absorber.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A cargo carrier removably securable to a rear end of a vehicle comprising:

a T-bar comprised of a carrier adapter secured approximately perpendicularly to a hollow tube, one end of said carrier adapter removably securing to a female adapter provided on a rear end of a vehicle, said hollow tube being approximately parallel to the ground when said T-bar is secured to said vehicle, a torque bar extending through said hollow tube with first and second ends of said torque bar extending beyond first and second ends respectively of said hollow tube, said ends of said torque bar slightly flexible upward and downward in a vertical plane and also flexible torsionally, a first end of a platform releasably latching to said first end of said torque bar, an opposite second end of said platform being pivotably secured to said second end of said torque bar by means of a double slanted axis.

2. A cargo carrier according to claim 1 further comprising:

a first electrically powered actuator secured on one of its ends to said second end of said torque bar and secured on its opposite end to said second end of said platform in order to swing said platform from said double slanted axis in a controlled manner when said first end of said platform in unlatched from said first end of said torque bar, and a second electrically powered actuator movably engaging both said hollow tube and said torque bar in order to rotate in a controlled manner said torque bar relative to said hollow tube.

3. A cargo carrier according to claim 2 further comprising an electrically operated latch provided on said first end of said platform for releasably latching said first end of said platform to said first end of said torque bar.

4. A cargo carrier according to claim 2 further comprising:

means for releasably locking said torque bar to said hollow tube to prevent said torque bar from rotating within said hollow tube.

5. A cargo carrier according to claim 1 further comprising:

a manually operative latch provided on said first end of said platform releasably engagable with an ear provided on said first end of said torque bar as a means for releasably latching said first end of said platform to said first end of said torque bar.

6. A cargo carrier according to claim 5 further comprising:

a pair of spaced apart fingers located one above the other, said fingers secured to said first end of said torque bar adjacent said ear and extending rearward from said first end of said torque bar so that said first end of said platform enters between said fingers as said latch approaches said ear in order to properly align said latch to releasably engage said ear.

7. A cargo carrier according to claim 1 wherein said platform further comprises a perimeter frame, mesh provided within the frame to form a floor of the platform, a plurality of support bars each securing by one of its ends to one side of the frame and securing by its opposite end to an opposite side of the frame in order to provide additional support and strength to the mesh.

8. A cargo carrier according to claim 7 wherein said perimeter frame is provided with stake holders at a front end and a rear end of the platform, and said perimeter frame is provided with openings on said first and said second ends of said platform.

9. A cargo carrier according to claim 1 further comprising:

an opposite second end of said carrier adapter extending rearward of said vehicle when said T-bar is secured to said vehicle, and said second end removably securing to a male adapter provided on a separate device.

10. A cargo carrier according to claim 1 further comprising:

a spring loaded pin movably secured to said first end of said torque bar adjacent to said first end of said hollow tube, at least one sleeve provided on said first end of said hollow tube adjacent said first end of said torque bar so that said pin removably enters said at least one sleeve in order to secure said torque bar to said hollow tube and to prevent said torque bar from rotating within said hollow tube.

11. A cargo carrier according to claim 1 further comprising:

handles provided on said platform in order to allow the user to lift said platform, and means to releasably secure said platform relative to said T-bar.

12. A cargo carrier according to claim 1 further comprising a gas charged spring cylinder secured on one of its ends to said second end of said torque bar and secured on its opposite end to said second end of said platform, said gas charged spring cylinder outwardly biased so that it pushes the first end of said platform in a controlled manner away from said first end of said torque bar when said first end of said platform is unlatched from said first end of said torque bar.

13. A cargo carrier comprising:

a T-bar removably securable to a female adapter provided on an end of a vehicle, a torque bar extending through and freely rotatable within said T-bar so that said torque bar is approximately parallel to the ground and ends of said torque bar extend outward from said T-bar and are approximately parallel with the end of the vehicle to which the T-bar is removably secured, a first end of a platform releasably latching to a first end of said torque bar and an opposite second end of said platform pivotally secured to an opposite second end of said torque bar by means of a double slanted axis.

14. A cargo carrier according to claim 13 further comprising:

means to releasably secure said torque bar to said T-bar so that said torque bar does not rotate relative to said T-bar when so secured.

15. A cargo carrier according to claim 14 further comprising:

a means for swinging said platform on said double slanted axis when said first end of said platform is unlatched from said first end of said torque bar.

16. A cargo carrier according to claim 15 further comprising:

means for rotating said torque bar relative to said T-bar in order to lower and raise said first end of said platform to and from the ground when said first end of said platform is unlatched from and swung away from said first end of said torque bar.

17. A cargo carrier according to claim 16 wherein said means for swinging said platform is electrically operated, and said means for rotating said torque bar is electrically operated.

18. A cargo carrier according to claim 17 further comprising:

an electrically operated latch provided on said first end of said platform for releasably latching said first end of said platform to said first end of said torque bar.

19. A cargo carrier according to claim 13 wherein said double slanted axis is slanted upward and slightly away from said T-bar and slanted upward and slightly toward a front end of said T-bar.

* * * * *